Oct. 14, 1969     M. K. HOSSMANN     3,472,598
APPARATUS FOR DETERMINING THE RELATIVE INDEX OF REFRACTION
OF LIGHT PERMEABLE SUBSTANCES
Filed July 18, 1966

INVENTOR
MARCEL K. HOSSMANN

By *Mulfino and Toren*
attorneys

3,472,598
APPARATUS FOR DETERMINING THE RELATIVE INDEX OF REFRACTION OF LIGHT PERMEABLE SUBSTANCES
Marcel K. Hossmann, Zurich, Switzerland, assignor to Albiswerk Zurich A.G., Zurich, Switzerland
Filed July 18, 1966, Ser. No. 565,945
Claims priority, application Switzerland, Sept. 3, 1965, 12,338/65
Int. Cl. G01b 9/02
U.S. Cl. 356—107
11 Claims

ABSTRACT OF THE DISCLOSURE

In a method for determining the index of refraction of light permeable substances, rays from a source of white light are refracted to provide plural monochromatic light rays having respective different frequencies. One such ray is divided into two partial rays extending in parallel relation along equal length paths, with one partial ray being passed through a light permeable substance having a known index of refraction and the other through a light permeable substance whose relative index of refraction is to be determined. The two partial rays are recombined into one ray at the ends of the two paths, and the combined ray is directed to an observation point to produce a first pattern of interference bands. The same steps are then performed with other monochromatic light rays having frequencies differing from the first frequency and continued until the first pattern of interference bands is again produced at the observation point and at a second respective light frequency. The difference between the first and second frequencies is a measure of the relative index of refraction which is to be determined, as compared to the known index of refraction. An interferometer is provided to practice the method and includes a prism as the refracting means, a diaphragm for selecting the different monochromatic light rays, and a photocell having the recombined ray directed thereon.

---

Figure 1:
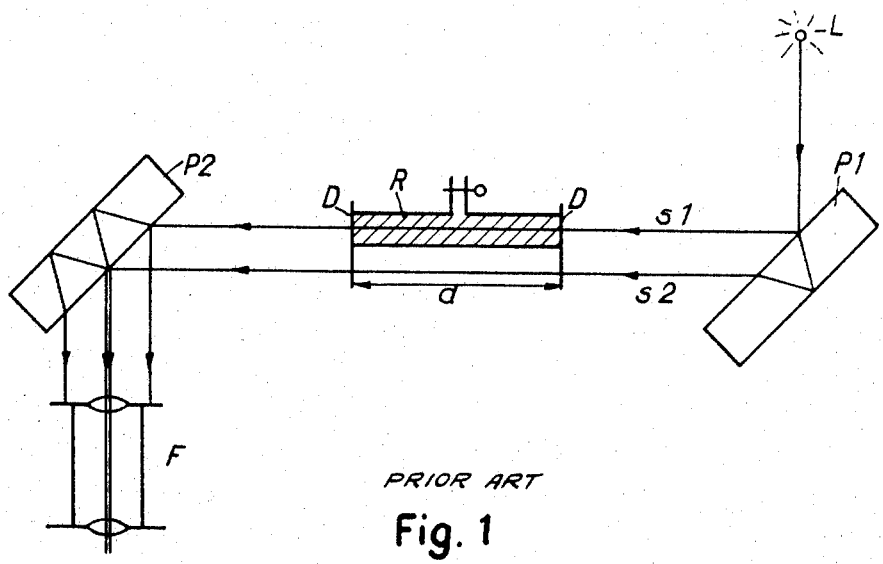

This invention relates to a method of and apparatus for determining the index of refraction of light permeable substances, such as an interferometer, and, more particularly, to a novel and improved interferometer in which one partial light ray is passed through a medium whose index of refraction is known, and a second partial light ray is passed through a substance or medium whose index of refraction is unknown, and the two rays are then compared by observation of the interference bands.

In accordance with the invention, an interferometer is provided in which monochromatic light is reflected by two plane-parallel glass plates of equal thickness, the light being reflected from the front surfaces as well as the rear surfaces of these plates. Thereby, a light ray is divided, at the first plate, into two partial rays and the two partial rays are combined into one ray at the second plate. One of the two rays is passed, over a given distance between the glass plates, through a medium of known index of refraction. The second ray is passed, over the same distance, through the substance having an unknown index of refraction. The recombined rays form a pattern of interference bands by means of which the relative index of refraction of the light permeable substance in relation to the medium having a known index of refraction can be determined.

According to Maxwell's electromagnetic theory of light, the velocity $u$ of light depends on the dielectric constant and on the permeability $\mu$ of the medium in which the light is propagated. The generally valid relation is:

$$u = \frac{1}{\sqrt{\epsilon \epsilon_0 \mu \mu_0}} \qquad (1)$$

where $\epsilon_0$ is the influence constant and $\mu_0$ is the induction constant in the vacuum. The light velocity $c$ in the vacuum thus is:

$$c = \frac{1}{\sqrt{\epsilon_0 \mu_0}} \qquad (2)$$

From the Equations 1 and 2, the ratio of light velocity $c$ in the vacuum to the light velocity $u$ in a medium can be calculated as follows:

$$\frac{c}{u} = \sqrt{\epsilon \mu} = n \qquad (3)$$

This ratio is designated as the index of refraction $n$. If the conditions are limited to non-magnetizable or very slightly magnetizable substances, for which $u$ may be made equal to 1, Equation 3 is simplified to:

$$\frac{c}{u} = \sqrt{\epsilon} = n \qquad (4)$$

Thus the ratio of light velocity in vacuum to light velocity in a given medium is equal to the index of refraction. The measurement of an index of refraction therefore is based, in principle, on the comparison of two light velocities, and for this various methods are known.

The most accurate method is based upon the following facts. The relation between the frequency $\nu$ the wave length $\lambda$ and the velocity $u$ of a sine light wave is as follows:

$$u = \nu \lambda \qquad (5)$$

Since the frequency $\nu$ of light does not change along the light ray path through different substances, the specific equation for passage of light through a vacuum is as follows:

$$c = \nu \lambda_0 \qquad (6)$$

wherein $\lambda_0$ is the wave length in a vacuum.
By combining Equations 4, 5 and 6, there is obtained:

$$\frac{c}{u} = n = \frac{\lambda_0}{\lambda} \qquad (7)$$

The measurement of the index of refraction $n$ of a medium is thus reduced to a comparison of the wave lentgh of light in a vacuum with the wave length in the respective medium at a constant frequency of the light. This method is used in all known interferometers.

In a known interferometer, two plane and parallel glass plates of equal thickness are so arranged that light rays from a monochromatic light source enter a telescope after reflection by the two plates. Each ray is divided by the first plate into two parts, by reflection at the front surface and the rear surface, respectively. Both rays are again reflected at the front and rear surfaces of the second plate and received by the telescope. The paths of the two rays are not of the same length if the two plates are not exactly parallel. Depending on the angle at which the rays of the divergent beam fall on the first plate, and depending on the inclination of the plates relative to each other, the partial rays belonging to each incident ray enter the telescope with a phase difference. As these partial rays are coherent, they give rise, in the telescope, to interferences. Therefore, in the field of vision of the telescope there is a system of equidistant light and dark bands, known as interference bands, whose distances and whose positions depend on the mutual position of the plates.

An air-filled vessel is inserted between the plates in such a manner that one of the two partial rays passes through the vessel and the other partial ray passes outside the vessel. In order to prevent the end walls of the vessel from falsifying the measurements, the end walls are extended so that they are traversed by the partial ray passing outside the vessel. If the air pressure in the vessel is changed, the index of refraction of the air, and thus the wave length of the light within the vessel, is changed. Consequently, for equal distances inside and outside the vessel, there are no longer the same number of wave lengths. Thus the phase distance between the interfering rays varies.

With this arrangement, the measurement of the index of refraction of the air is effected by first evacuating the vessel. If air is then allowed to flow into the vessel, the interference bands observed in the telescope shift. By counting the shifting interference bands, a number is obtained and, by the use of equations, the index of refraction of the air at a certain temperature and at a certain pressure can thus be determined.

This interferometer has the disadvantage that evacuated vessels must be used, and must be filled with air for each measurement. Moreover, it is usable only to determine the indices of refraction of gaseous or liquid substances and cannot be used to determine the index of refraction of solid substances.

An object of the invention is to provide apparatus for determining the index of refraction of a substance in relation to the index of refraction of a medium having a known index of refraction.

Another object of the invention is to provide such an apparatus in which monochromatic light is produced from white light with an adjustable light refraction device.

A further object of the invention is to provide such an apparatus in which, at the observation point, a light detector is provided, which the combined rays irradiate through a diaphragm.

Another object of the invention is to provide an apparatus in which the maximum opening of the diaphragm is the same size as the band width.

A further object of the invention is to provide such an apparatus of the type mentioned in which the relative index of refraction is determined by measuring the frequency difference between two color frequencies which, upon adjustment of the light refraction device, produce successively equal information in the light detector.

An important object of the invention is to provide a novel and improved method of determining the index of refraction of a substance whose index of refraction is unknown.

For an understanding of the principles of the invention, reference is made to the following description of a typical embodiment of the invention as illustrated in the accompanying drawings.

In the drawings:

FIG. 1 is a somewhat schematic illustration of the known interferometer mentioned above; and FIG. 2 is a somewhat schematic representation of the interferometer embodying the invention.

Referring first to the prior art apparatus shown in FIG. 1, this is an interferometer which was first proposed by Jamin. Two plane and parallel glass plates P1 and P2 of equal thickness are so arranged that light rays from a monochromatic light source L enter a telescope F after refraction at both plates. Each light ray is divided by the first plate P1 into two parts $s1$ and $s2$ by reflection at the front surface and rear surface of the plate P1, respectively. Both rays $s1$ and $s2$ are again reflected at the front surface and the rear surface of plate P2 and are then directed into the telescope F.

As can be observed from FIG. 1, the paths of the two rays $s1$ and $s2$ are not of the same length if the two plates P1 and P2 are not exactly parallel. Depending on the angle at which the rays of the divergent beam fall on the first plate P1, and depending on the relative inclination of plates P1 and P2 with respect to each other, the partial rays $s1$ and $s2$ of each incident ray enter telescope F with a phase difference $\Delta$. As these partial rays $s1$ and $s2$ are coherent, they give rise, in the telescope, to interferences, forming: brightness maxima, when $\Delta = k\lambda$, and brightness minima, when $\Delta = (k+\frac{1}{2})\lambda$. In this equation, $k$ is an integer.

Therefore, in the field of vision of the telescope, there appears a system of equidistant light and dark bands, known as interference bands. The spacing and position of these bands depends on mutual interrelation of plates P1 and P2. Between the two plates P1 and P2, an air-filled vessel R is inserted in such a manner that one of the two partial rays, such as the partial ray $s1$, passes through vessel R and the other partial ray $s2$ passes outside of vessel R. In order that the end walls of vessel R will not result in a falsification of the measurements, the end walls or cover plates D traversed by the light ray $s1$ are extended into the path of second light ray $s2$ so that the latter ray $s2$ passes through the walls or plates D.

If the air pressure $p$ in the vessel R is now changed, the index of refraction $n$ of the air, and hence the wave length of the light within vessel R, change. Thus, through a distance $d$, there are no longer the same number of wave lengths inside and outside vessel R. Hence the phase difference $\Delta$ between the interfering rays $s1$ and $s2$ varies.

The measurement of refraction $n$ of the air can now be effected in the following manner. First, vessel R is evacuated. The number $q$ of wave lengths $\lambda_0$ in vessel R is now $q = d/\lambda_0$. If air is now permitted to enter vessel R, the interference bands observed in telescope F shift. By counting these passing interference bands, a number Z is obtained. From the equations mentioned above, the index of refraction $n$ of the air at a certain temperature and a certain pressure can thus be determined as follows:

$$n = 1 + \frac{Z}{d}\lambda_0 \qquad (8)$$

As mentioned, the interferometer shown in FIG. 1 has certain disadvantages. In addition, in the general case the number Z need not be an integer, and it is thus difficult to read in counting the passing interference bands.

In accordance with the invention, as distinguished from the interferometer shown in FIG. 1, there is inserted in the path of one ray, for example, the ray $s1$, an evacuated vessel R. The second ray, such as the ray $s2$, passes only through the ambient air.

There is thus obtained, after reflection at the plate P2, an interference between the two rays $s1$ and $s2$ which, though having the same frequency, have a different phase position. Naturally, there are light frequencies at which the waves of the two rays are in phase or, respectively, in phase opposition. Thus, at the observation point, brightness maxima or brightness minima will occur. After using one of the light frequencies, the frequency is varied until the same phase position re-occurs.

In the first instance, with the frequency $\nu$, there are, through the distance $d$ in the evacuated vessel R a certain number of periods called $p\lambda_0$. In the same distance $d$ outside the vessel R the number of periods is $q\lambda$. At a frequency $\nu$, the wave length in vessel R is $\lambda_0 = c/\nu$, and the wave length outside the vessel is $\lambda = u/\nu$. The second case results in the same phase position at the observation point, at a different light frequency $\nu^*$. If it is assumed that, in the vessel R, there are $(p+x)\lambda_0^*$ periods, and, in the same distance in air $(q+x\pm 1)\lambda^*$ periods, with a new frequency $\nu^*$, the wave length in the vessel is thus: $\lambda_0^* = c/\nu^*$, and the wave length outside the vessel is $\lambda^* = u/\nu^*$.

A distance $d$ in the vessel thus can be expressed by light velocities $c$ and $u$, as well as by light frequencies $\nu$ and $\nu^*$ as follows:

$$d = p\frac{c}{\nu} = q\frac{u}{\nu} = (p+x)\frac{c}{\nu^*} = (q+x\pm 1)\frac{u}{\nu^*} \quad (9)$$

By representing the light velocity $u$ in air as the quotient of the light velocity in a vacuum $c$ and the index of refraction $n$, $$u = \frac{c}{n} \quad (10)$$

and inserting in Equation 9, there is obtained:

$$\frac{d}{c} = \frac{p}{\nu} = \frac{q}{n\cdot\nu} = \frac{p+x}{\nu^*} = \frac{q+x\pm 1}{n\cdot\nu^*} \quad (11)$$

From Equation 11, the numbers $q$ and $p$ can be calculated as follows:

$$q = p\cdot n \quad (12)$$

and hence also:

$$p = \frac{\nu d}{c} \quad (13)$$

By insertion into Equation 11, the index of refraction $n$ can be resolved as follows:

$$n = 1 \pm \frac{c}{d(\nu^* - \nu)} \quad (14)$$

With Equation 14 for the index of refraction $n$, it is possible to infer, from the example given for vacuum and ambient air, to other substances, for example, glass having a known index of refraction and glass having an unknown index of refraction. Instead of the light velocity in vacuum $c$, there would have to be inserted the light velocity in the substance having the known index of refraction.

Figure 2:
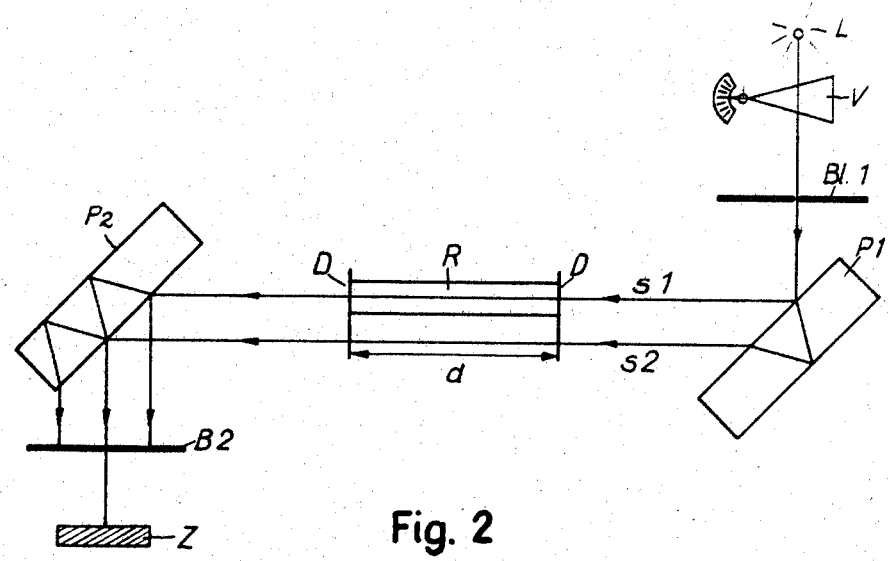

FIG. 2 illustrates an interferometer embodying the invention. Referring to FIG. 2, the two glass plates P1 and P2, mentioned above, are plane-parallel-plates of equal thickness which are positioned in parallel relation to each other. The first glass plate P1 has directed thereon light from a light source L through a light refracting device, such as a prism V. From a light ray selected from the spectrum by means of the diaphragm B1–1, there are formed, by reflection at the front and rear faces of glass plate P1, the two partial light rays $s1$ and $s2$. Both these light rays impinge on the second glass plate P2 and are reflected from the surfaces thereof. The two reflected rays are coincident and are guided onto a photocell Z by means of a second diaphragm B–2. By rotation of prism V, each spectral color from the white light can be separately directed onto the photocell Z.

An evacuated vessel R is positioned in the path, between the glass plates P1 and P2, of one ray $s1$. The end cover surfaces D of vessel R are extended into the path of the second ray $s2$. For the measuremeant of the relative index of refraction, prism V is now so adjusted that photocell Z furnishes, for example, a minimum current, which can be determined in a known manner by means of an amplifier and a measuring instrument. Then the frequency of the light is determined, and the prism is rotated until the next dark point falls on photocell Z. The new light frequency is then determined. From Equation 14, the index of refraction of the ambient air can then be calculated exactly. The light frequencies can be indicated by a pointer and a scale associated with the drive for rotating prism V, as illustrated in FIG. 2.

What is claimed is:

1. A method for determining the relative index of refraction of light permeable substances, comprising the steps of: refracting the rays from a source of white light to provide plural monochromatic light rays at respective frequencies; dividing one monochromatic ray, having a first respective frequency, into two partial rays extending in parallel relation along equal length paths; passing one partial ray through a light permeable substance having a known index of refraction; passing the other partial ray through a light permeable substance whose relative index of refraction is to be determined; at the ends of the two paths, recombining the two partial rays into one re-combined ray; directing the combined ray to an observation point to produce thereat a first pattern of interference bands; successively performing the same steps with monochromatic other light rays having respective frequencies different from said first frequency, until said first pattern of interference bands is again produced at said observation point at a second respective frequency; and measuring the difference between said first and second respective frequencies as a measure of the relative index of refraction of the light permeable substance, whose index of refraction is to be determined, as compared to the known index of refraction.

2. A method, as claimed in claim 1, including the steps of positioning a light amplitude detector at said observation point; said first pattern of interference bands producing a first detected value at said light detector, and the interference pattern produced at said second respective frequency reproducing said first detected value at said light detector.

3. A method, as claimed in claim 1, including the steps of positioning an optical electric transducer at said observation point; said first pattern of interference bands producing a first electrical output from said transducer, and the pattern of interference bands produced at said second respective frequency resulting in reproduction of said first electric output from said optical electric transducer.

4. A method, as claimed in claim 1, including the steps of limiting the width of said recombined rays to the band width of the rays from said source of white light.

5. In apparatus for determining the index of refraction of light permeable substances relative to the known index refraction of a medium, and of the type including an interferometer in which light from a source is reflected at two plane parallel glass plates of equal thickness and at both the front and rear surfaces of the glass plates so that a light ray from the source is divided, at a first glass plate into two rays and, at the second glass plate, the two rays are recombined into one ray, the two rays passing, between the glass plates, through the same distance and in substantially parallel relation, with one ray passing through a medium having a known index of refraction and the other of the two rays passing through the light permeable substance whose relative index of refraction is to be determined, the recombined one ray producing, at an observation point, a pattern of interference bands: the improvement comprising, in combination, said light source comprising a source of white light; refraction means positioned in the path of light from said source to the first glass plate to divide the light from said source into monochromatic light rays each having a different respective frequency; a diaphragm positioned between said refraction means and the first glass plate to direct light rays from said refraction means to said first glass plate; said refraction means being angularly adjustable to direct only a selected monochromatic light ray, having a respective frequency, through said diaphragm; a light detector at said observation point; and a second diaphragm positioned between the second glass plate and said light detector and operable to direct a light ray from said second glass plate to said light detector; whereby said refraction means may be angularly adjusted to direct selected monochromatic light rays, each having a respective different frequency, to said light detector until said light detector detects a first predetermined light value, corresponding to a first monochromatic light ray having a first respective frequency, after which said refraction means may be angularly adjusted until said light detector indicates said first light value while having directed thereto a second monochromatic light ray having a second respective frequency, producing said first light value at said light detector, with the relative index of refraction of the light permeable substance being determined by the difference between said first and second frequencies.

6. The improvement claimed in claim 5, including the light detector at said observation point providing detected values corresponding to the respective patterns of interference bands at said observation point.

7. The improvement claimed in claim 5, including an optical electric transducer at said observation point having respective electrical outputs corresponding to respective patterns of interference bands at said observation point.

8. The improvement claimed in claim 5, including the said second diaphragm having an opening not greater than the band width of the rays from said light source.

9. The improvement claimed in claim 8, including an optical-electric transducer positioned at said observation point and having a recombined light ray directed thereupon through said diaphragm; said transducer having respective electric outputs corresponding to the respective patterns of interference bands produced at said observation point.

10. The improvement claimed in claim 9, in which said optical-electric transducer is a photoelectric device.

11. The improvement, claimed in claim 10, in which said refraction means is a prism; and indicating means operatively associated with the said prism and indicating the respective frequency of the monochromatic light ray then directed to said photoelectric device.

References Cited

UNITED STATES PATENTS 2,703,033   3/1955   Svensson.
3,186,294   6/1965   Woodson.

JEWELL H. PEDERSEN, Primary Examiner

T. MAJOR, Assistant Examiner

U.S. Cl. X.R.

356—128